Dec. 27, 1949     P. A. ROELL     2,492,323
FISHING POLE HOLDER
Filed Feb. 11, 1947
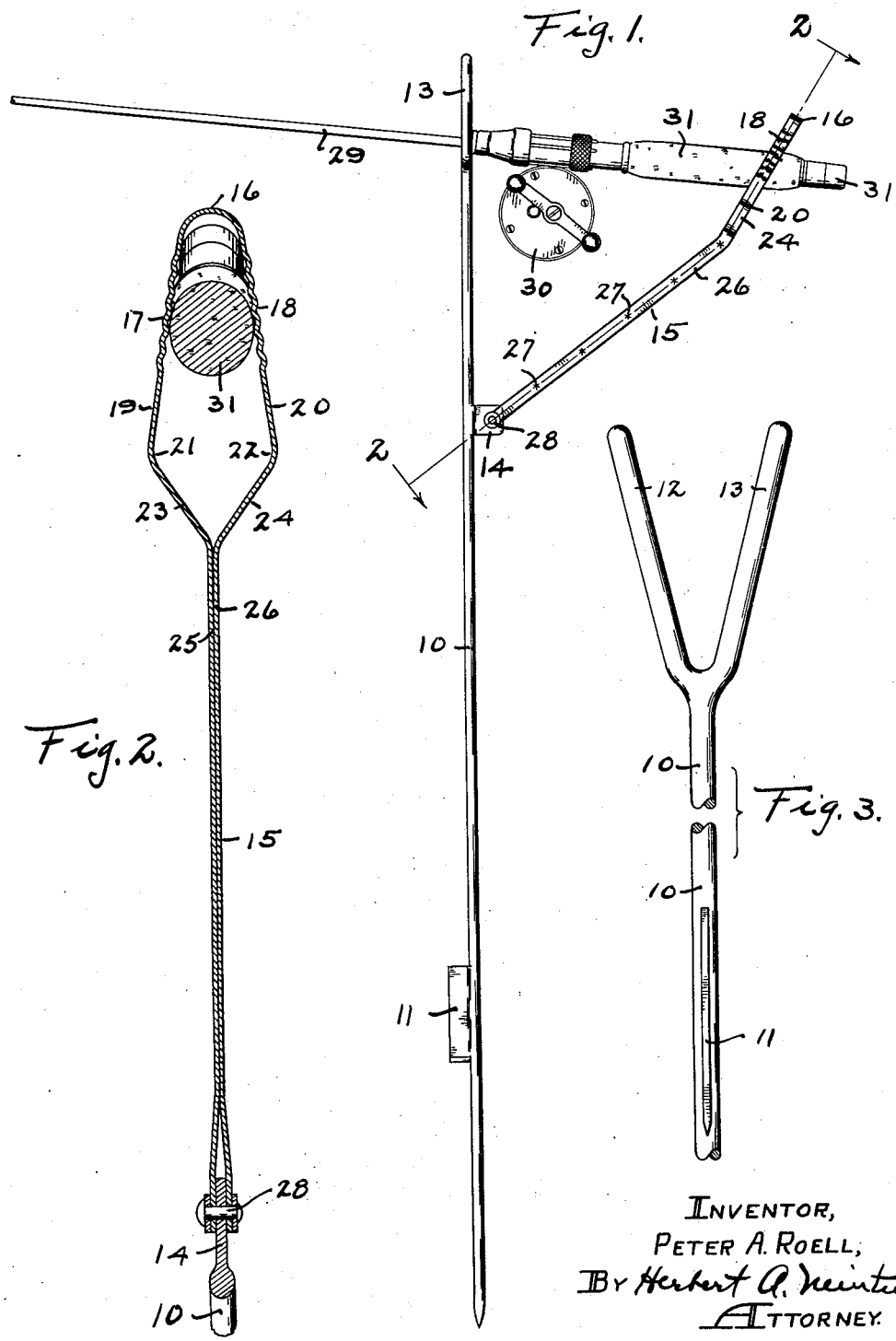
INVENTOR,
PETER A. ROELL,
By Herbert A. McIntury
ATTORNEY.

Patented Dec. 27, 1949

2,492,323

UNITED STATES PATENT OFFICE 2,492,323

FISHING POLE HOLDER

Peter A. Roell, Indianapolis, Ind.

Application February 11, 1947, Serial No. 727,877

2 Claims. (Cl. 248—38)

This invention relates to means for holding a fishing pole and is particularly adapted for use by still fishermen. The invention is embodied in a structure which is usable by such fishermen along the shores of bodies of water. A primary advantage of the invention is that the structure embodied embodies but two parts, one hinged to the other, and being so constructed that it may be inserted into the earth to have the pole carrying across upper members in such manner that increasing downward pull on the tip end of the pole will cause the handle end to become more firmly gripped by resilient means to the end that the pole does not become displaced from the device until the handle is pushed downwardly to forcibly disengage it from that holding means.

This and other objects and advantages of the invention will become apparent to those versed in the art in the following description of one particular form of the invention, as illustrated in the accompanying drawing, in which Fig. 1 is a view in side elevation of a structure embodying the invention;

Fig. 2, a view in section on the line 2—2 in Fig. 1; and,

Fig. 3, a view in front elevation.

Referring to the drawing, in which like characters of reference indicate like parts in the several views, I form a standard 10 here shown as consisting essentially of a metal rod. On one side of this rod 10 toward its lower end I provide a fin 11 fixed thereto as a means to prevent rotation of the rod 10 when it is in use. The lower end of the rod 10 is preferably sharpened as indicated in Fig. 1.

The upper end of this rod 10 is bifurcated to have the two outwardly diverging fingers 12 and 13 to define a V opening therebetween. Then spaced downwardly from the juncture of these fingers 12 and 13 with the rod 10 is a lug 14 turned rearwardly from the rod in relation to the fin 11. This spacing of the lug 14 as indicated is approximately between six and seven inches.

I form an arm generally designated by the numeral 15 out of resilient metal such as steel. This arm 15 is constructed by bending a length of the metal to have an outer U bend 16 from which the metal extends from both sides thereof by corrugated lengths 17 and 18 respectively, these lengths preferably diverging one from the other. Then the metal is carried from the corrugated lengths 17 and 18 for a distance in each instance by straight lengths 19 and 20 to be carried through bends 21 and 22 by lengths 23 and 24 carried in inwardly one toward the other and finally to continue by the lengths 25 and 26, one in contact with the other. Preferably these lengths 25 and 26 are connected by any suitable means such as by spot welds 27.

The extreme ends of these lengths 25 and 26 are spread apart to receive the lug 14 therebetween and to be pivoted to that lug 14 by any suitable means such as by a rivet 28, the normal elasticity of the ends of the lengths 25 and 26 causing those ends to frictionally grip the lug 14 therebetween, and the rivet 28 is drawn up to increase that frictional engagement, but still permit swinging of the arm 15 about the pivot rivet 28.

In use, any kind of a fishing pole 29 herein shown as the common type of steel pole, is laid across the upper end of the rod 10 between the fingers 12 and 13 to have the reel 30 behind those fingers, if a reel be used. The arm 15 is rocked around and upwardly to have the arm portions 19 and 20 straddle the handle 31 as indicated in Figs. 1 and 2.

The handle 31 is preferably pulled upwardly into engagement with the corrugated portions 17 and 18 although this is not necessary. Since the lateral spacing between the portions 17, 19 and 18, 20 decrease as the handle 31 may approach the loop 16, those corrugated portions 17 and 18 are brought into more compressive contact with the opposing sides of the handle 31 as the outer end of the pole 29 may be pulled downwardly. In other words, any tendency toward rocking of the pole 29 over the fulcrum provided between the arms 12 and 13, tends to seat the pole handle in the looped end of the arm 15. However, it requires no great exertion to release the arm 15 from this gripping action on the handle 31.

In transportation, the arm 15 may be swung upwardly to have the looped end lie along the fingers 12 and 13 or actually extend therebetween in parts at least. It is further to be noted that at the junction of the metal lengths 23 and 24 with the elongated lengths 25 and 26 respectively, that portion of the arm extending outwardly therefrom is carried upwardly as indicated in Fig. 1, rather than being in straight alignment with the portions 25 and 26. This angular displacement of the looped end of the arm 15 brings the corrugations in the loop portions 17 and 18 more nearly parallel with the axis of the handle 31, although parallelism is not required. This angular bending does permit the use of a shorter overall length of the arm 15. In other words, the pivoted rivet 28 can be placed nearer to the fulcrum of the pole than would be the case if the arm was continued in a straight manner.

The combined length of the lengths 17 and 19 is substantially twice the lateral distance between the outer end of the corrugated length 17. The same proportion holds for the lengths 18 and 20. This provides a long slope of the opposing arm lengths which define the opening through which the pole handle extends, so as to give the desired sliding handle grip.

Thus it is to be seen that I have provided a very simple and yet usable structure which may be operated by women and children as well as men in fishing from the shoreline so that a number of poles may be employed by any one fisherman and the poles be carried up off of the ground in observable positions. While I have shown the invention in the one particular form, it is obvious that structural variations may be employed without departing from the spirit of the invention and I therefore do not desire to be limited to that precise form beyond the limitations by the following claims.

I claim:

1. A fishing pole holder comprising a supporting rod; rod fulcrum means at the top of the rod; an arm adjustably pivoted to the rod below the fulcrum; a pair of elastic members extending from said arm in spaced opposed relation to have outer portions slope inwardly one toward the other and unite across their outer ends; and corrugations across said elastic members; friction means holding the said arm at selected angular positions in relation to said rod; said elastic members defining an elongated opening therebetween with the major dimension thereacross adjacent said arm; whereby the arm may be swung to have handle of said pole entered through said opening to locate said corrugations in the path of the handle and primarily thereabove to permit the handle to be engaged thereby upon rocking of the pole over said fulcrum.

2. A fishing pole holder comprising a supporting rod having an upper end notch through which the pole may fulcrum; and an arm adjustably pivoted to the rod below said notch to be frictionally retained in selected angular positions in relation to the rod; said arm consisting of a resilient metal strap bent upon itself to have an outer V bend, from which bend corrugated lengths of the strap extend outwardly diverging one from the other from a spacing apart dimension less than the diameter of the handle of said pole to a dimension greater than said diameter, the latter dimension being spaced from the first dimension a distance approximately three times the first dimension.

PETER A. ROELL.

REFERENCES CITED

The following references are of record in the file of this patent:

UNITED STATES PATENTS

| Number | Name | Date |
|---|---|---|
| 1,091,491 | Ebur | Mar. 31, 1914 |

FOREIGN PATENTS

| Number | Country | Date |
|---|---|---|
| 14,246 | Great Britain | July 4, 1908 |
| 38,439 | France | Mar. 3, 1931 |